Patented Dec. 14, 1926.

1,610,270

UNITED STATES PATENT OFFICE.

JACOB EHRLICH, OF BELLEVILLE, NEW JERSEY.

OIL-SOLVENT PROCESS.

No Drawing.   Application filed February 9, 1925. Serial No. 8,058.

My invention relates to solvent processes and refers particularly to processes for the solvent extraction of oils from oil-containing substances.

My invention comprises a process for the extraction of fatty and essential oils from oleaginous substances, among which are linseed, cotton-seed, mustard seed, copra and other such materials, by the employment of solvents having valuable solvent properties for this purpose and which, in addition, possess qualities which enables their application to be accompanied by economic and safety values not found in the solvents formerly employed for this purpose.

I have found that nuclear halogenated aromatic hydrocarbons possess unexpected solvent powers for the extraction of oils from oleaginous substances and that they possess other chemical properties which make them particularly valuable for the indicated purposes.

As the dissolved oils must be separated from the solvents, it is essential that the recovery of the solvent be capable of accomplishment in the most thorough manner, accompanied by a minimum of expense and danger, and in these particulars the solvents of my process possess the highest efficiency.

The usual solvents employed for oil extrications are of high inflammability, thus making their application of the greater danger and in this respect the solvents of my process present great manufacturing advantages as their inflammability is much less than those of the present employed solvents.

Another great advantage of my process rests in the solvents I employ which do not react appreciably with water at the temperature of employment, whereas the chlorine derivatives of aliphatic hydrocarbons often employed as solvents, which have the property of not being very inflammable, nevertheless do react under similar conditions appreciably with any water present, yielding hydrochloric acid, which corrodes metallic vessels and therefore require the employment of expensive equipment. This property of the solvents I employ, allows of the use of the oleaginous materials without preliminary drying.

Among the nuclear halogenated aromatic hydrocarbons which I have found to be particularly suitable and valuable for the solvent removal of fatty and volatile oils are mono-chlorbenzene, ortho-dichlorbenzene, para-dichlorbenzene, ortho-chlortoluene, and para-chlortoluene.

When para-dichlorbenzene is employed, it is preferable to use it at temperatures above its melting point, that is above 53° C., whereas ortho-dichlorbenzene, because of its low solidifying point, about minus 14° C., can be used at ordinary temperatures.

For economic reasons I prefer to employ the so-called ortho-dichlorbenzene of commerce, which is approximately 75% ortho-dichlorbenzene and 25% para-dichlorbenzene.

In the following application of my process, the oleaginous material is thoroughly agitated in the presence of liquefied nuclear halogenated aromatic hydrocarbons in a closed vessel to prevent loss of solvent, the hydrocarbon with the dissolved oils then being removed from the undissolved residue.

As the particular means of treatment of the oleaginous materials with the solvent is dependent upon the material and solvent employed; as the particular means for separating the solvent and the dissolved oils from the undissolved substances is dependent upon the particular solvent, oils and undissolved substances; and as the particular means for separating the dissolved oils from the solvents containing them is dependent upon the particular oils and solvents employed, and as these several means of separation are well known to those conversant with the art, I do not limit myself to any particular method of separation, which must necessarily vary with, and be dependent upon, the substances and materials employed.

My invention, therefore, does not rest in the particular steps of separation but in the employment of the solvents mentioned herein, the steps of separation being incident to the recovery of the oils from the substances containing them.

Mono-chlorbenzene has a relatively low boiling point (132°) and can, therefore, be distilled directly, whereas the ortho and para-dichlorbenzenes both boil over 170° C., which temperature would be more likely to decompose the dissolved substance, so that recourse is had to steam distillation, since both ortho and para-dichlorbenzenes pass over readily with steam at 100° C., or distillation with vacuum may be employed. With substances not subject to decomposition at the temperature of distillation, however, direct distillation could be employed as, for instance, cotton-seed oil. Crushed mustard seed in an iron extraction apparatus, without any preliminary drying, is extracted with a mixture of ortho and para-dichlorbenzol at about 50° C., until the amount of fatty and essential oil present in the seed is reduced to a minimum. The extract is now distilled with saturated steam at atmospheric pressure in a suitable iron apparatus, whereby the solvent and essential oil are removed, leaving behind the fatty oil. The latter, after separation from the water present by gravity or otherwise, is obtained directly in a pure and readily marketable condition.

The oil which passes over with the steam contains both the solvent and essential oil. These are separated by ordinary refractionation with steam whereby the essential oil and the solvent are readily obtained in a form suitable for use and the exhausted solid material is freed from solvent by means of steam at atmospheric pressure.

When I refer to nuclear halogenated aromatic hydrocarbon in my specification and claims I mean one such nuclear halogenated aromatic hydrocarbon or a mixture of two or more members of such hydrocarbons.

By "non-polymerized oils" I mean those animal and vegetable oils which are free from, or practically free from, polymerization during the process.

I do not limit myself to the particular nuclear halogenated aromatic hydrocarbons, nor to the quantities, temperatures and steps of process particularly mentioned, as these are given simply as a means for clearly explaining the process of my invention.

What I claim is:—

1. The process of extracting non-polymerized oils from animal and vegetable oleaginous materials containing them which comprise treating the oleaginous materials with a nuclear halogenated aromatic hydrocarbon liquid at the operating temperatures, separating the hydrocarbon and the oils dissolved therein from the undissolved materials and recovering the thus dissolved oils from the employed hydrocarbon.

2. The process of extracting non-polymerized oils from animal and vegetable oleaginous materials containing them which comprises treating the oleaginous materials with a liquid mixture of ortho-dichlorbenzene and para-dichlorbenzene, separating the said dichlorbenzene mixture and the oils dissolved therein from the undissolved materials and recovering the said dissolved oils from the dichlorbenzene mixture.

3. The process of extracting non-polymerized oils from animal and vegetable oleaginous materials containing them which comprises treating the oleaginous materials with a liquid mixture of ortho-dichlorbenzene and para-dichlorbenzene, separating the said dichlorbenzene mixture and the oils dissolved therein from the undissolved materials and recovering the said dissolved oils from the dichlorbenzene mixture by distillation.

4. The process of extracting non-polymerized oils from animal and vegetable oleaginous materials containing them which comprises treating the oleaginous materials with a nuclear halogenated aromatic hydrocarbon liquid at the operating temperatures, separating the hydrocarbon and the oils dissolved therein from the undissolved materials by distillation and recovering the thus dissolved oils from the employed hydrocarbon by distillation.

5. In the process of extracting non-polymerized oils from animal and vegetable oleaginous materials containing them, the step which comprises dissolving the oils with a nuclear halogenated aromatic hydrocarbon liquid at the operating temperatures.

6. In the process of extracting non-polymerized oils from animal and vegetable oleaginous materials containing them, the step which comprises dissolving the oils with a liquid mixture of ortho-dichlorbenzene and para-dichlorbenzene.

Signed at Belleville, in the county of Essex and State of New Jersey, this 2nd day of February, 1925.

JACOB EHRLICH.